Jan. 23, 1962   H. KOLLER   3,018,058
CROP SPRAYERS
Filed April 22, 1959
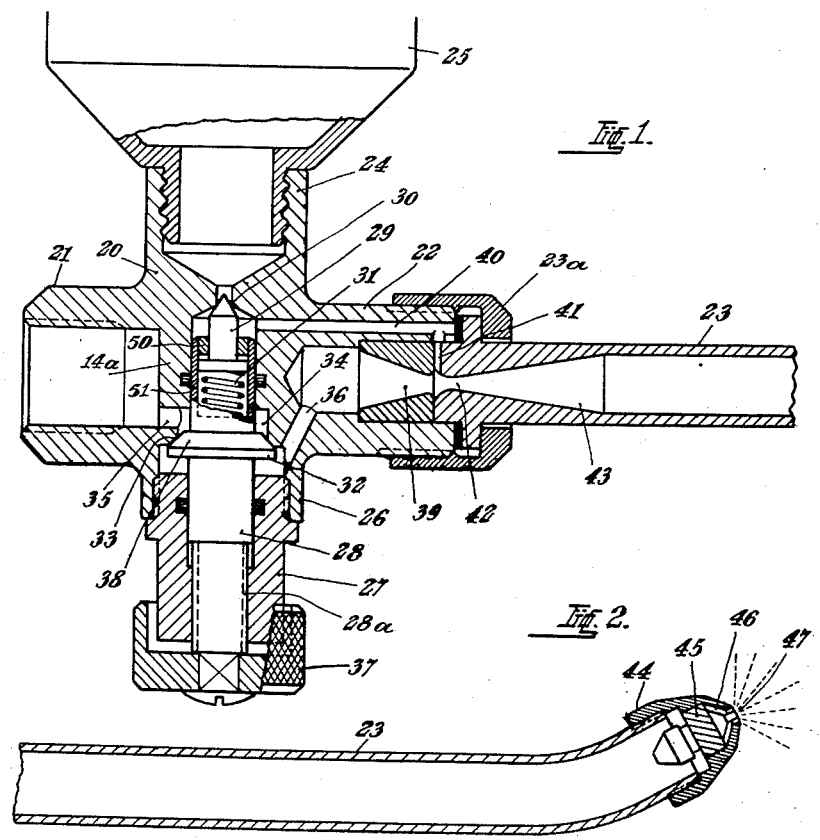
INVENTOR.
HANS KOLLER
BY Leon M. Straus

United States Patent Office 3,018,058
Patented Jan. 23, 1962

3,018,058
CROP SPRAYERS
Hans Koller, Muhletalstrasse 34,
Zofingen, Switzerland
Filed Apr. 22, 1959, Ser. No. 808,235
Claims priority, application Switzerland Apr. 24, 1958
6 Claims. (Cl. 239—318)

This invention relates to crop sprayers for fighting parasites by spraying growing plants with a liquid containing additives.

According to the present invention there is a sprayer for spraying crops with a liquid containing an additive, comprising a hollow distributor body having an inlet end adapted for connection to a supply of water under pressure and through which water is arranged to flow to a conical mixing chamber the apex end of which communicates with a distributor pipe having a through passage of lesser cross-sectional area than that of the inlet end of the body, an additive container mounted on the body, an additive delivery channel connecting the container with the mixing chamber, adjustable valve means co-operating with said channel to control the rate of additive delivery to the mixing chamber, and a spray-forming nozzle connected with the distribution pipe at the delivery end thereof.

It is an important object of the invention to provide a sprayer capable of being used on crops to spray the correct solution and concentration of an insecticide thereon and having means for easily and conveniently adjusting the concentration of the insecticide.

In order that the invention may be clearly understood an embodiment thereof will now be described, by way of example, with reference to the accompanying drawings, in which:

FIG. 1 is a side elevational view, partly in section, of a sprayer according to the invention, and FIG. 2 is a sectional detail view of the delivery pipe forming a part of the invention.

Referring to FIG. 1, the sprayer comprises a distributor body 20 which is of T-shape and which has a connector socket 21 to receive a pipe (not shown) to supply water under pressure to the body 20. On the side of the body opposite connector 21 is a connector 22 for a distributor pipe 23 held in position by a nut 23a. A connector 24 for an additive container 25 and a connector 26 for a guide member 27 are disposed at right-angles to the longitudinal axis of the distributor body. The guide member 27 houses a valve spindle 28 carrying a needle valve 29 which is housed in a valve housing 14a and protrudes into a passage 30 which communicates with the container 25 and with delivery channels 40, 41 which connect the container with the conical mixing chamber 42. For the purpose of axial setting, the needle valve 29 is inserted into the hollow end of the spindle 28 and the needle valve 29 is axially adjustable and is spring-loaded by a helical spring 31. The valve spindle 28 carries a conical valve head 32, which co-operates with a conical valve seat 33 in the transfer passage bore 34 and so permits control of the flow of water from the bore 35 to the bore 36. The outer end of the spindle 28 is provided with a screw-thread 28a threadedly engaged in guide member 27 and is rotatable by a setting knob 37 fixedly secured to spindle 28 to permit adjustment of the valves 29, 32.

The operation of knob 37 will cause the conical valve member 32 to be first withdrawn from the valve feed 33 opening passage 38. Further actuation of knob 37 will cause the complete withdrawal of needle valve 29 opening passage 30 due to the presence of stop 50 and collar 51 and permit flow of additives. The liquid flows through the annular opening 38 formed by displacement of the valve head 32 from seat 33 and through bore 36 to a conical nozzle 39 from whence it passes to the mixing chamber 42 to which the additive enters from the delivery passages 40 and 41. The mixture then passes through the delivery pipe 23 to the spray-forming nozzle formed by the elements 44, 45, 46, FIG. 2, and leaves the nozzle through opening 47 in the form of a fine mist or spray.

The embodiments of the invention in which an exclusive property or privilege is claimed are defined as follows:

1. A sprayer for spraying crops; comprising a hollow distributor body having a liquid inlet defined on one side with a discharge passage defined on a substantially opposite side, a mixing material inlet defined on another distinct side with a valve chamber defined in the center and extending outwardly on a substantially opposite side from said mixing material inlet and being in communication with said liquid inlet, wall means defining a valve seat in said valve chamber adjacent said liquid inlet and a needle valve opening connecting said valve chamber with said mixing material inlet, a first relatively small sized passage defined in said body communicating with the lower end of said valve chamber and said discharge passage, a second relatively small sized passage defined in said body communicating with the upper end of said valve chamber and said discharge passage, nozzle means in said discharge passage downstream of said first small passage connection, said nozzle means including a through passage with a portion of reduced cross-section, and said second passage being connected to said discharge passage at such location, and a combination needle and plate valve disposed in said valve chamber with a needle valve upper end portion closing said needle valve opening and an outstanding plate valve portion intermediate its length closing the communication between said inlet, said valve chamber and said discharge passage, and means to adjust the positions of said needle and plate valve portions to selectively admit liquid and mixing material to said discharge passage.

2. A sprayer for spraying crops according to claim 1, wherein said means to adjust the position of said needle and plate valve portions permits independent movement of said plate valve away from its seat without corresponding movement of the needle valve away from its seat.

3. A sprayer for spraying crops according to claim 1, wherein said combination needle and plate valve includes an outer sleeve portion carrying said plate valve, said needle valve being reciprocable within said sleeve portion and said means to adjust the positions of said needle and plate valve including means for adjusting a relative position of said needle valve portion and said plate valve portion.

4. A sprayer for spraying crops according to claim 1, including a nozzle member connected to said discharge passage and having an internal area of reduced cross-section.

5. A sprayer for spraying crops according to claim 1, wherein said first and second small passages are directed tangentially into said discharge passage.

6. A sprayer for spraying crops according to claim 1, including means for biasing said needle valve against said valve plate in a manner so that its distance in the open position of both said valve needle and said valve plate is larger than in the simultaneous sealing position of both said valve needle and said valve plate.

References Cited in the file of this patent

UNITED STATES PATENTS

| | | |
|---|---|---|
| 730,723 | Verschuren | June 9, 1903 |
| 1,057,657 | Mott | Apr. 1, 1913 |
| 1,769,266 | Lusier | July 1, 1930 |
| 1,870,058 | Levine | Aug. 2, 1932 |
| 2,034,623 | Kraft | Mar. 17, 1936 |
| 2,062,097 | Lingard | Nov. 24, 1936 |
| 2,869,347 | Gray et al. | Jan. 20, 1959 |

FOREIGN PATENTS

| | | |
|---|---|---|
| 653,035 | Germany | Nov. 12, 1937 |